Patented Sept. 11, 1945

2,384,501

UNITED STATES PATENT OFFICE 2,384,501

PLATINUM METAL CATALYSTS AND THE MANUFACTURE THEREOF

Johann S. Streicher, Newark, N. J., assignor to The American Platinum Works, Newark, N. J., a corporation of New Jersey No Drawing. Application February 2, 1942, Serial No. 429,294

9 Claims. (Cl. 252—259)

This invention is concerned with improvements in platinum metal catalysts and the manufacture thereof and relates in particular to platinum metal catalysts for catalytic hydrogenation processes.

Hydrogenation processes generally involve the reaction of organic compounds with hydrogen. Platinum metal catalysts for hydrogenation processes usually comprise platinum metal, in particular platinum and palladium, in more or less finely divided form, such as platinum metal black or colloidal platinum metal. The platinum metal black produced by R. Adams by reduction of complex platinum metal oxides formed by fusion of a hydrochloride or an ammonium salt of the platinum metal with a large excess of a nitrate of alkali metal or alkaline earth metal constitutes a catalyst possessing an exceedingly high degree of catalytic efficiency in excess of that of other forms of finely divided platinum metal. The main shortcoming of the Adams type of platinum metal catalyst as well as that of other such forms of active catalysts as heretofore known resides in the difficulty of obtaining the catalyst with the specific and certain degree of subdivision accompanying maximum activity and guaranteeing the easiest way of recovery from the catalyzed solvent. Likewise, such platinum metal catalyst can be used only for one catalytic operation, in that after its first use the platinum metal must be recovered in non-catalytic form and be completely reworked to produce an active catalyst.

It is one object of my invention to provide a platinum metal catalyst which has from its very beginning a reproducible specific and certain degree of subdivision accompanying maximum catalytic activity and which shall be capable of being easily recovered from the reaction liquid. It is a further object of my invention to produce a catalyst which shall have a catalytic activity in excess of that of catalysts as heretofore known. Another object of my invention is to produce a catalyst having the above mentioned properties and which shall have a long useful life and be capable of being used in a plurality of catalytic operations. It is a still further object of my invention to provide such catalyst for catalytic hydrogenation processes.

The catalyst, according to my invention, comprises platinum metal derived from platinum metal alloys in the manner hereinafter specified. The catalyst is produced by first alloying the desired platinum metal with at least one suitable base metal, and, preferably, with two or more base metals, and subjecting the alloy to a treatment whereby the greater part of the base metal or base metals is removed, whereupon the platinum metal is left behind in the shape of a skeleton which still contains minor amounts of base metals. The platinum skeleton is in finely divided and highly hydrogen-charged form and in a condition of surprisingly high catalytic activity. Any base metal capable of forming a metal compound with the platinum metal can be utilized in the preparation of the starting alloy, such for instance as zinc, cadmium, beryllium, bismuth, aluminum, magnesium, tellurium, selenium, lead, etc. Such metals as iron, nickel, cobalt, manganese and copper form predominantly solid solutions when alloyed with the platinum metals, and are not substantially capable of forming metal compounds therewith; in such cases alloys of platinum metal with one or more base metals forming only solid solutions are further alloyed with one or more metals which form metal compounds with the other alloy constituents, but at least with the platinum metal, to produce alloy combinations such for instance as platinum-copper-aluminum, palladium-copper-aluminum, platinum-nickel-aluminum, platinum-iron-aluminum, platinum - copper - magnesium, platinum-copper-nickel-zinc, platinum-copper-cobalt-tin, etc. In these combinations the metals copper, nickel, iron and cobalt form solid solutions only with the platinum metal, but upon the addition of such base metals as aluminum, magnesium, zinc and tin, chemical compounds such as $Al_3Pt$, $Al_2Cu$, $Al_3Ni$, $Mg_2Pt$, $Al_3Fe$, $Cu_2Mg$, $Pt_2Zn_3$, $Pd_3Sn_2$, $Pt_2Sn_3$, $Cu_3Sn$, $Co_2Sn$, etc., are formed.

The alloys containing the platinum metal constituents as chemical compounds are cast into forms from which they can be easily broken up into small pieces or powder, whereupon the alloy is subjected to a chemical treatment by means of which the greater part of the base metal is removed from the alloy. Where the alloy contains base metals such as zinc, aluminum or the like only, the chemical solvent for these base metals may be a strong alkali hydroxide or hydrochloric acid. The alkaline solvent alone, however, does not produce good well-acting platinum metal catalysts, as platinum metal catalysts treated with alkaline solvents only are generally extremely sluggish or inactive and become active catalysts only when the alkaline treatment is followed and ended by a hydrochloric acid treatment. Therefore, the dissolving treatment by hydrochloric acid is to be preferred since it produces with absolute certainty the catalyst having always the highest catalytic activity. Solvents capable of dissolving or attacking platinum metal, such as nitric acid, are to be avoided.

After the removal of the base metal from the alloys the platinum metal substantially follows in its characteristics the structure of the original alloy of platinum with the base metal utilized and is predominantly crystalline, as distinguished for instance from the substantially amorphous structure of platinum metal black. The platinum metal, forming the catalyst, according to this invention, is in the state of a fine skeleton. From the very beginning, when it is ready for use as a catalyst, the platinum metal structure so produced is in the proper state of subdivision accompanying maximum catalytic activity. Any given degree of such subdivision is capable of being uniformly reproduced in the case of each alloy employed. The catalyst according to the invention is, therefore, distinguished, for instance, from the Adams type of platinum catalyst, where the subdivision accompanying maximum catalytic activity is with each sample more or less accidental. The platinum metal, forming the catalyst according to this invention, is heavy enough to settle by gravity from the reaction liquid. It is, therefore, a simple procedure to remove my catalyst from the liquid containing the hydrogenated substance.

I have found that the catalytic character of the platinum metal skeletons is not essentially changed if the base metals alloyed with the platinum metals to form chemical compounds are used in the required proportions forming these metallic compounds only, or with such an excess that the initially formed metallic compounds are more or less dissolved in this excess of base metals. The use of such an excess of these base metals, however, facilitates somewhat the proper formation of the platinum metal compound during the melting procedure and the acid treatment of the alloy and, therefore, the quick formation of the completely hydrogen-charged catalyst during the acid treatment.

It had been generally believed, heretofore, that platinum metal catalysts should not contain any base metal constituents. In the case of the catalyst according to my invention, however, the decisive factor responsible for the degree of catalytic activity obtained is not the purity of the platinum metal, but special crystal structure produced, i. e. the skeleton left when the chemical compound of the platinum metal with base metal is destroyed by the removal, total or partial, of the base metal. Also, the retention of base metal within the skeleton seems to be rather essential not only for producing a skeleton offering and preserving a special large catalytic external surface and internal pores of coarse dimensions, but also for producing a skeleton of great hardness and, therefore, of extreme ruggedness and having the power of absorbing hydrogen to the high degree characteristic of catalysts according to this invention.

The following examples serve to illustrate the method of producing catalysts according to my invention:

*Example 1*

2 grams of platinum foil are carefully wrapped up in about 8 to 20 grams of aluminum foil, preferably in such a way that the platinum foil is evenly divided into several small aluminum foil packages. About 20 to 60 grams aluminum are separately fused under a highly reducing atmosphere, e. g., in a high-frequency furnace, and are slightly overheated, and the aluminum foil packages containing the platinum foil are dropped therein whereby instant and complete alloying of the aluminum with the platinum takes place. The instant alloying produces great heat locally, and care must be taken, therefore, that with each aluminum foil package only small portions of platinum are incorporated into the melt, since otherwise spattering may occur, or even small explosions, causing mechanical losses of precious metal. The 20 to 60 grams of fused aluminum may naturally serve to alloy more than 2 grams of platinum, and in a normal good alloying procedure about 10%–20% platinum may be incorporated, such melts being always liquid at about 700° C. In the case of about 40% platinum the melting temperature rises to about 800° C. After having assured complete alloying of the platinum and the aluminum the melt is poured out. The resulting alloy, after cooling, is treated with dilute hydrochloric acid until the reaction with the acid has completely ceased. The black residue remaining after decantation of the solution is again treated with pure dilute hydrochloric acid and heated on the steambath. After decantation of the hot acid any remaining traces of acid are substituted, through the repeated decantation procedure, by hot distilled water. The resulting catalyst consists of a platinum-aluminum skeleton highly charged with hydrogen, for which reason it must be kept covered with water or any other suitable solvent to avoid access of air and sudden ignition.

*Example 2*

15 grams of palladium sponge are fused together with about 150 to 200 grams of zinc, e. g., in a gas heated furnace under a reducing atmosphere. The palladium sponge is incorporated into the fused zinc wrapped in zinc foil and in small portions to avoid spattering caused by the lively action of zinc and palladium during the alloying procedure. After alloying the alloy is removed from the furnace for cooling. The zinc-palladium button thus obtained is treated with an excess of pure dilute hydrochloric acid. The black residue, remaining after decantation of the solution, is treated once more with pure dilute hydrochloric acid and heated on the steam bath. After decantation of the hot acid any remaining traces of acid are substituted, through the repeated decantation procedure, by hot distilled water. The resulting catalyst consists of a palladium-zinc skeleton highly charged with hydrogen which must be kept covered with water or any other suitable solvent to avoid access of air and sudden ignition. It is ready for use as catalyst in this hydrogen-charged state.

*Example 3*

5 grams of platinum foil are dissolved in dilute aqua regia and thereupon about 70 grams of zinc nitrate $(Zn(NO_3)_2.6H_2O)$, equivalent to about 15 grams of zinc are added. The mixture is evaporated to half its original volume. About 75 grams of infusorial earth (kieselgur) are added, and the resulting mass is thoroughly stirred and dried on the steam bath. The mixture is heated slowly in an electric muffle to about 500° C. in the presence of a strong air current. Copious brown fumes are given off and a mixture of platinum oxide and zinc oxide is formed on the kieselgur carrier. After cooling, the reaction mass is crushed and treated with hydrogen at about 350° to 480° C., to reduce the platinum and zinc oxides. whereby the resulting metal mixture is alloyed on the kieselgur carrier since zinc produced from the oxide melts at about 419° C. After cooling in hydrogen the reaction mass is treated with dilute hydrochloric acid, and, after decanting, with hot distilled water; finally, the water is replaced, after several decantations, by methyl alcohol. A highly hydrogen charged platinum catalyst on a kieselgur carrier is obtained and having the structure of a platinum-zinc skeleton on such carrier.

*Example 4*

100 grams of the brittle alloy consisting of equal parts of copper and aluminum are fused under a salt cover, and small packages containing 15 grams of platinum foil carefully wrapped in aluminum foil are dropped into the melt. After stirring and slight over-heating the mass is poured out, and, after crushing, the brittle alloy is treated repeatedly with dilute hydrochloric acid in a manner similar to that described in Example 1. The resulting catalyst consists of a platinum skeleton still containing minor amounts of copper and aluminum and is highly charged with hydrogen.

The catalyst according to my invention possesses a very high degree of catalytic efficiency which is even in excess of the catalysts of the Adams type which heretofore had been considered to constitute the most efficient catalyst for hydrogenation processes. Catalysts of the Adams type always show considerably reduced catalytic activity after their first use, whereas the catalysts of my invention not only show this high initial catalytic activity when compared with Adams blacks but consistently preserve their high initial catalytic activity during their repeated use.

The platinum metal product remaining after the removal of the base metal from the starting alloy, and representing the catalyst according to this invention, loses its catalytic properties on drying in air. In order to avoid any impairment of its catalytic properties the catalyst must be kept at all times in a wet state, being submerged preferably in an aqueous or organic medium when not in use. In case through some accidental drying in air or otherwise the catalysts of the present invention have become completely inactive, they are best reactivated by heating them in hydrogen or nitrogen for a short time, at about 300° to 500° C., to completely destroy the remnant explosive hydrogen compounds of the catalysts, realloying the resulting residues and treating the thus obtained alloys with hydrochloric acid as previously described. No reworking, that is, complete recovery and refining of the precious metal, is required for the catalysts of the present invention, as distinguished from the platinum metal catalysts of the Adams type.

I have found that the catalysts, according to this invention, increase their catalytic activity and performance when prepared from a platinum metal alloy containing at least one base metal having a negative potential of 0.40 and more, such as cadmium, zinc, aluminum, beryllium, magnesium, etc. This rule applies particularly to palladium catalysts which when thus prepared become practically equal in efficiency and performance to platinum catalysts similarly prepared. Remnants within the platinum metal skeleton of such highly negative base metals seem to even enhance the faculty of the platinum metal to become completely saturated with hydrogen in which charged state the catalysts, according to this invention, develop their greatest catalytic power.

While I have described my invention with particular reference to catalysts of platinum and palladium, my invention is equally applicable to other members of the platinum group and the term "platinum metal" as herein used is intended to include not only platinum and palladium but also other metals of the platinum group, and may include a plurality of such metals, so that the starting alloy may contain more than one platinum metal when it is desired to obtain a catalyst combining advantageous catalytic properties of one platinum metal with those of another platinum metal. The terms "removing" and "dissolving" as used in the appended claims shall not imply that the base metal constituent is necessarily removed in its entirety since, as pointed out above, base metal may be retained in the catalytic residue of the starting alloy.

The catalysts, according to this invention, are mainly unsupported catalysts. However, the catalysts may, in special cases, be provided in supported form, as shown in Example 3, for instance by depositing on a suitable carrier a mixture of oxides of platinum metal and of base metal, reducing such oxides at a temperature at which the metal compounds are formed by the diffusion procedure at the moment the metals are produced by reducing the metal oxides on the carrier and finally treating the diffusion alloys in the manner herein described so as to remove the base metal content. The deposition of oxides of platinum metal and of base metal on supports is described for instance in my copending application Serial No. 363,006, filed October 26, 1940. Other means of forming alloys on carriers prior to the removal of the base metal therefrom may likewise be utilized for the preparation of supported catalysts according to my invention. In the case of such supported catalysts the platinum metal is deposited on the support in an adherent layer of finely divided hydrogen-charged platinum metal.

What I claim is:

1. The method of preparing platinum metal catalysts, comprising alloying platinum metal with at least one base metal capable of forming a chemical combination with said platinum metal, and removing the base metal from said alloy by means of a chemical treatment embodying at least in its final stage the employment of acid, whereby there is produced finely divided platinum metal of high catalytic activity.

2. The method according to claim 1 wherein the base metal is alloyed with said patinum metal in excess of that amount necessary to form a chemical combination of said platinum metal and said base metal.

3. The method of preparing a palladium catalyst, comprising alloying palladium with at least one base metal capable of forming a chemical combination with said palladium, and dissolving the base metal from said alloy by means of a chemical treatment embodying at least in its final stage the employment of acid, whereby there is produced finely divided palladium of high catalytic activity.

4. The method of preparing platinum metal catalysts, comprising alloying platinum metal with at least one base metal having a negative potential of at least 0.40 and capable of forming a chemical combination with at least one metal constituent of the resultant alloy, and removing the base metal from said alloy by means of a chemical treatment embodying at least in its final stage the employment of acid, whereby there is produced finely divided platinum metal of high catalytic activity.

5. The method of preparing a palladium catalyst, comprising alloying palladium with at least one base metal having a negative potential of at least 0.40 and capable of forming a chemical combination with at least one metal constituent of the resultant alloy, and removing the base metal from said alloy by means of a chemical treatment embodying at least in its final stage the employment of acid, whereby there is produced finely divided palladium of high catalytic activity.

6. The method of preparing platinum metal catalysts, comprising alloying platinum metal with at least one base metal capable of forming a chemical combination with said platinum metal, and removing the base metal from said alloy by means of an acid treatment only, whereby there is produced finely divided platinum metal of high catalytic activity.

7. The method of preparing platinum metal catalysts comprising alloying platinum metal with aluminum, and removing said aluminum from the alloy so formed by means of a chemical treatment embodying at least in its final stage the employment of acid, whereby there is produced a finely divided platinum metal catalyst of high catalytic activity.

8. The method of preparing platinum metal catalysts comprising alloying platinum metal with zinc, and removing said zinc from the alloy so formed by means of a chemical treatment embodying at least in its final stage the employment of acid, whereby there is produced a finely divided platinum metal catalyst of high catalytic activity.

9. The method of preparing platinum metal catalysts comprising alloying platinum metal with at least one base metal capable of forming a chemical combination with said platinum metal, the alloy so formed containing from 2.5% to approximately 40% platinum metal, and removing the base metal from said alloy by means of a chemical treatment embodying at least in its final stage the employment of acid, whereby there is produced a finely divided platinum metal catalyst of high catalytic activity.

JOHANN S. STREICHER.